(12) United States Patent
Ichijo et al.

(10) Patent No.: US 7,677,340 B2
(45) Date of Patent: Mar. 16, 2010

(54) HYBRID-TYPE FORKLIFT

(75) Inventors: Hisashi Ichijo, Aichi (JP); Shoichi Ieoka, Aichi (JP); Norihiko Kato, Aichi (JP); Masaru Sugai, Aichi (JP); Takaji Umeno, Aichi (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 919 days.

(21) Appl. No.: 11/394,020

(22) Filed: Mar. 29, 2006

(65) Prior Publication Data

US 2006/0243260 A1 Nov. 2, 2006

(30) Foreign Application Priority Data

Mar. 29, 2005 (JP) ............... 2005-095602

(51) Int. Cl.
*B60K 6/365* (2007.10)
(52) U.S. Cl. .............. 180/65.235; 903/910; 903/917
(58) Field of Classification Search ............ 180/65.21, 180/65.235, 65.25, 65.27, 65.275, 65.31; 903/910, 917
See application file for complete search history.

(56) References Cited

U.S. PATENT DOCUMENTS

| | | | | |
|---|---|---|---|---|
| 5,635,805 A | * | 6/1997 | Ibaraki et al. | 180/65.27 |
| 5,669,842 A | * | 9/1997 | Schmidt | 180/65.27 |
| 6,413,185 B1 | * | 7/2002 | Baginski et al. | 180/65.25 |
| 6,566,826 B2 | * | 5/2003 | Imai et al. | 318/11 |
| 6,569,055 B2 | * | 5/2003 | Urasawa et al. | 477/5 |
| 6,589,130 B1 | | 7/2003 | Baginski | |
| 6,863,633 B2 | * | 3/2005 | Misu | 475/5 |
| 7,261,170 B2 | * | 8/2007 | Leifert | 180/65.31 |
| 2002/0148144 A1 | | 10/2002 | Tokunaga | |
| 2002/0189397 A1 | * | 12/2002 | Sakamoto et al. | 180/65.2 |
| 2004/0097316 A1 | | 5/2004 | Misu | |

FOREIGN PATENT DOCUMENTS

| | | |
|---|---|---|
| JP | 60-153436 | 8/1985 |
| JP | 06-247190 | 9/1994 |
| JP | 2000-313600 A | 11/2000 |
| JP | 2002-315105 A | 10/2002 |
| JP | 2003-192299 | 7/2003 |
| JP | 2004-058921 A | 2/2004 |

\* cited by examiner

*Primary Examiner*—Frank B Vanaman
(74) *Attorney, Agent, or Firm*—Locke Lord Bissell & Lidell LLP

(57) ABSTRACT

When an engine is operated, a power dividing mechanism divides power of the engine to output the power to a motor for running operation and a motor for a cargo handling operation, respectively. Each of loads is driven via a rotational shaft of a corresponding one of the motors. By operating the engine and supplying the motors with electric power from a battery to operate the motors, each of the loads can also be driven by the sum of power of the engine and power of a corresponding one of the motors. When surplus power is generated in the power of the engine, each of the motors is operated as an electric power generating unit by the surplus power. As a result, the battery is charged.

7 Claims, 14 Drawing Sheets

HYBRID-TYPE FORKLIFT

BACKGROUND OF THE INVENTION

1. Field of the Invention

The present invention relates to a hybrid-type forklift, and more particularly, to a hybrid-type forklift having two power sources, that is, an engine and an electric motor.

2. Description of the Related Art

In general, a forklift known as an industrial vehicle uses an engine or an electric motor as a power source to drive a load for running operation (hereinafter, referred to as running load) and a load for performing a cargo handling operation (hereinafter, referred to as cargo handling load).

For example, JP 6-247190 A discloses an engine-type forklift for driving both the running load and the cargo handling load by means of a single engine. In performing the cargo handling operation while running, the operation of the engine is controlled based on an operation amount of a cargo handling lever, and the running speed of the forklift is controlled by means of a transmission mechanism having hydraulic clutches and brakes.

On the other hand, for example, JP 2003-192299 A discloses a battery-type forklift having two motors which cope with the running load and the cargo handling load, respectively. In this battery-type forklift, the motors are operated by being supplied with electric power from a battery so as to drive the running load and the cargo handling load.

Further, for example, JP 60-153436 A discloses a hybrid-type forklift that is mounted with an engine for charging a battery, in addition to two motors for driving the running load and the cargo handling load as disclosed in JP 2003-192299 A. In this hybrid-type forklift, an electric power generator is driven by the engine to charge the battery, and the motors operate by being supplied with electric power from the battery, to thereby drive the running load and the cargo handling load.

However, in the engine-type forklift as disclosed in JP 6-247190 A, during the cargo handling operation and the running operation, the operating condition of the engine is determined based on an operation amount of the cargo handling lever, and the running speed of the forklift is controlled by means of the transmission mechanism. As a result, it is difficult to realize an optimum operating condition for driving the engine at a low fuel consumption rate, with respect to torque patterns of both the cargo handling load and the running load. Also, since the hydraulic clutches and brakes are controlled to adjust the running speed of the forklift at this moment, a great energy loss is caused in some cases.

In general, a motor and a battery which are much larger in size than the engine are required when an attempt is made to obtain the same output as that of from the engine by using the motor. Accordingly, it is difficult to actually take out a large power when the running load and the cargo handling load are driven respectively by the motor and the battery mounted in the forklift as described in JP 2003-192299 A or JP 60-153436 A.

SUMMARY OF THE INVENTION

The present invention has been made to solve the above-mentioned problems, and it is therefore an object of the present invention to provide a hybrid-type forklift exhibiting a high energy efficiency while allowing a large power to be taken out.

A hybrid-type forklift according to the present invention includes an engine; a power dividing mechanism connected to the engine, for dividing and outputting power of the engine to a plurality of output ends; a plurality of motors connected to the plurality of output ends of the power dividing mechanism, respectively, each of the motors also serving as an electric power generating means; a plurality of loads connected to the plurality of output ends of the power dividing mechanism via rotational shafts of the plurality of motors, respectively; and a battery for storing electric power generated by the plurality of motors and for supplying each of the motors with electric power according to need to operate the motor, each of the loads being driven by at least one of power from the engine and power from a corresponding one of the motors.

The plurality of loads are each driven only by the power of the engine, by the sum of the power of a corresponding one of the motors and the power of the engine, or by the power of the corresponding one of the motors. When surplus power is generated in the power of the engine outputted to the motors, each of the motors is operated as electric power generating means by the surplus power and generate electric power, which are then stored into the battery.

DETAILED DESCRIPTION OF THE PREFERRED EMBODIMENTS

Embodiments of the present invention will be described hereinafter with reference to the accompanying drawings.

First Embodiment

Figure 1:
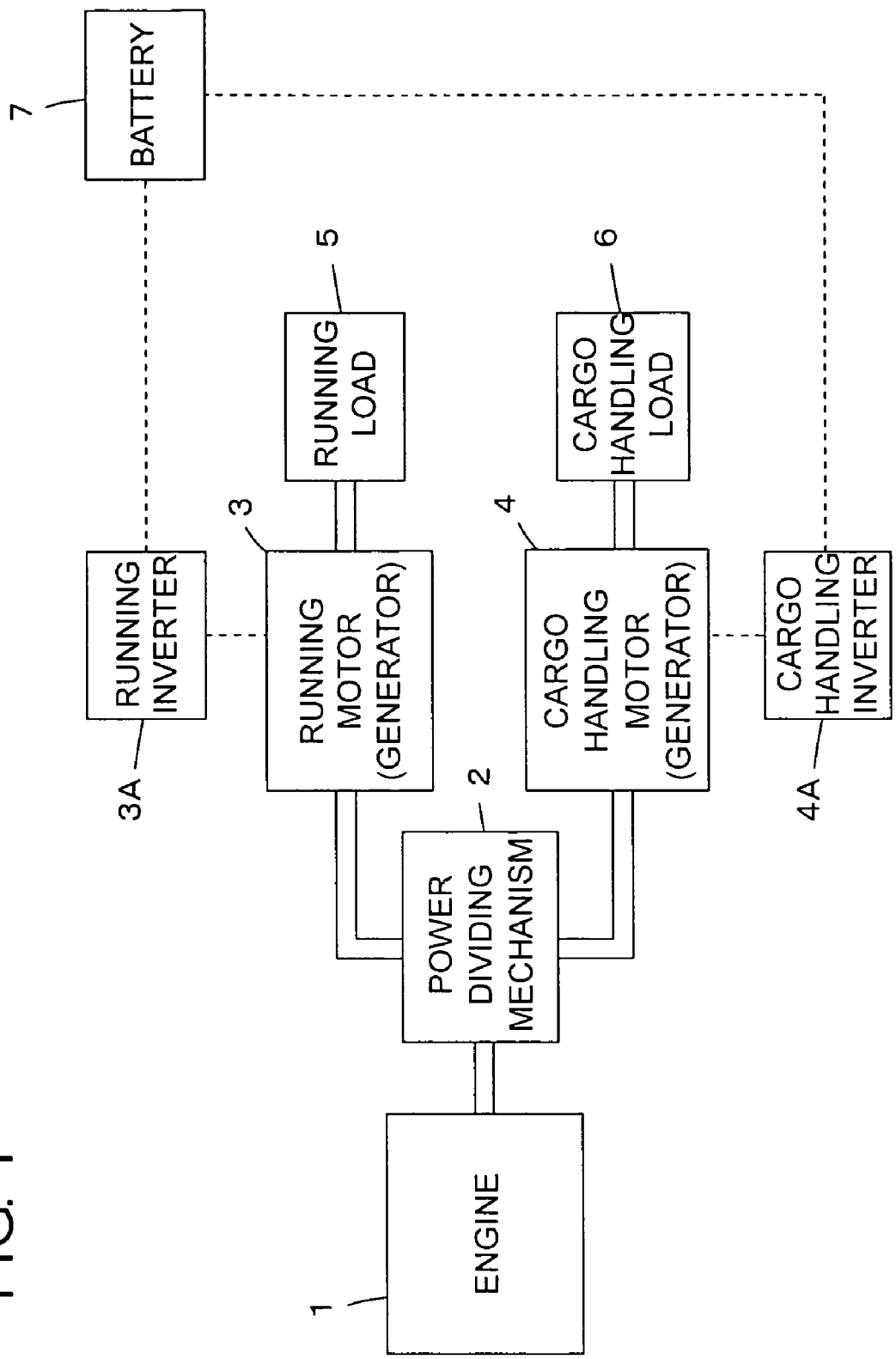
FIG. 1 is a block diagram showing a hybrid-type forklift according to a first embodiment of the present invention.

FIG. 1 shows a configuration of a hybrid-type forklift according to the first embodiment of the present invention. In this forklift, a running motor 3 and a cargo handling motor 4 are connected to an engine 1 via a power dividing mechanism 2. A running load 5 for running is connected to the running motor 3, and a cargo handling load 6 for performing a cargo handling operation such as raising/lowering of a fork is connected to the cargo handling motor 4. The running motor 3 and the cargo handling motor 4 each serves also as an electric power generating means, and are electrically connected to a battery 7 mounted on a base (not shown), via a running inverter 3A and a cargo handling inverter 4A, respectively. Electric power generated by operating the running motor 3 and the cargo handling motor 4 as the electric power generating means is stored into the battery 7 via the running inverter 3A and the cargo handling inverter 4A, respectively. The electric power thus stored is supplied, according to need, from the battery 7 to the running motor 3 and the cargo handling motor 4 via the running inverter 3A and the cargo handling inverter 4A, respectively, so the motors 3 and 4 are operated.

More specifically, a driving wheel for running is connected to the running motor 3 as the running load 5, and a hydraulic pump for supplying hydraulic oil to a hydraulic power unit for a cargo handling operation is connected to the cargo handling motor 4 as the cargo handling load 6.

Figure 2:
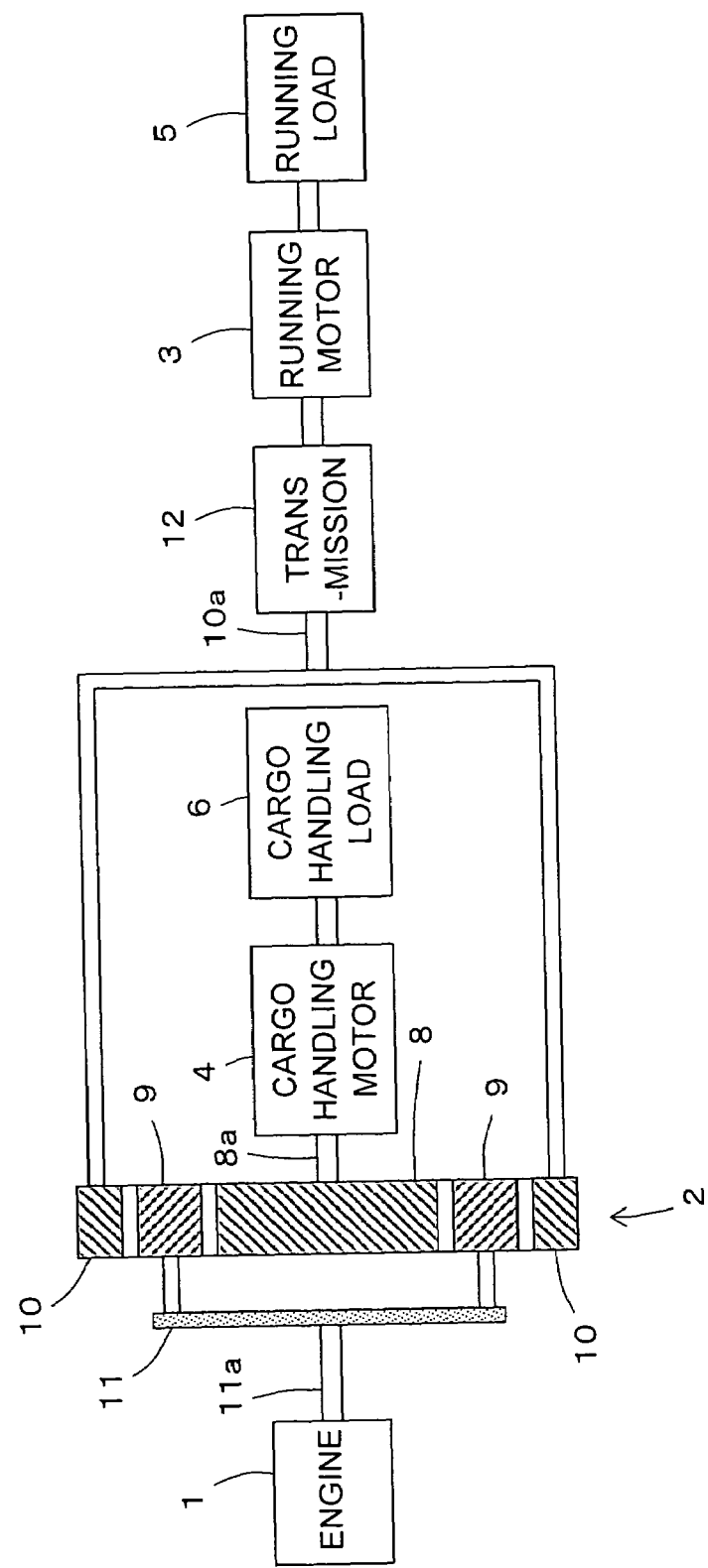
FIG. 2 is a sectional view showing a structure in the vicinity of a power dividing mechanism in the first embodiment.
Figure 3:
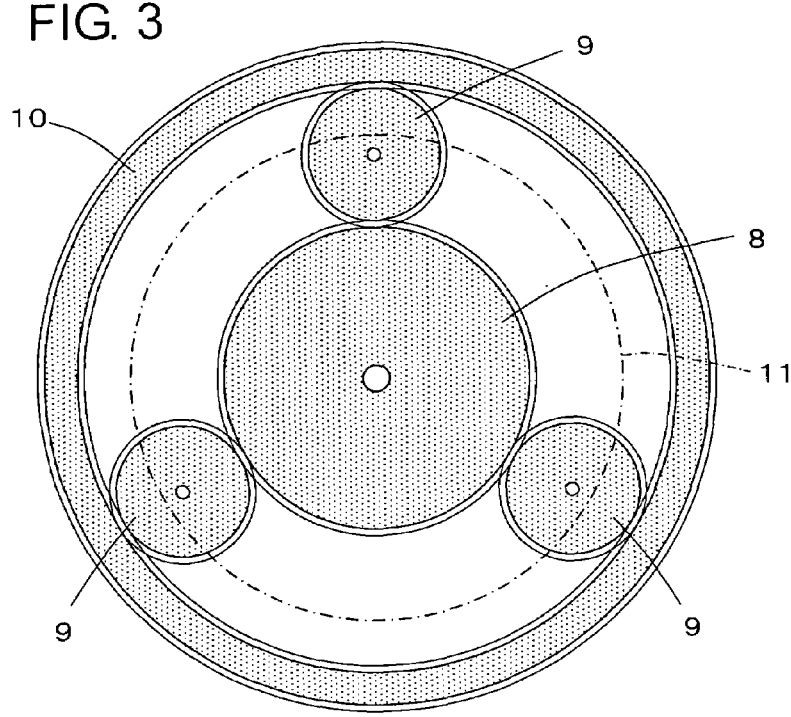
FIG. 3 is a front view showing a structure of the power dividing mechanism in the first embodiment.

The power dividing mechanism 2, which is designed to divide power of the engine 1 into two powers and output them, can be formed of a planetary gear device as shown in FIGS. 2 and 3. This planetary gear device has a sun gear 8 provided at the center, three planetary gears 9 arranged apart from one another on an outer peripheral portion of the sun gear 8, and an annular ring gear 10 so provided as to surround the sun gear 8 and the three planetary gears 9. Each of the sun gear 8 and the three planetary gears 9 is an external gear having teeth arranged and formed along its outer peripheral portion, and the ring gear 10 is an internal gear having teeth arranged and formed along its inner peripheral portion. Each of the three planetary gears 9 meshes with both the sun gear 8 and the ring gear 10. The three planetary gears 9 are coupled to one another by a carrier 11. Each of the planetary gears 9 can rotate around the sun gear 8 while rotating around its own axis.

A rotational shaft 11a used as an input end is coupled to the carrier 11. The engine 1 is connected to the rotational shaft 11a. Rotational shafts 8a and 10a, which are used as a first output end and a second output end, respectively, are coupled to the sun gear 8 and the ring gear 10, respectively. One end of a rotational shaft of the cargo handling motor 4 is connected to the rotational shaft 8a of the sun gear 8, and the cargo handling load 6 is connected to the other end of the rotational shaft of the cargo handling motor 4. One end of a rotational shaft of the running motor 3 is connected to the rotational shaft 10a of the ring gear 10 via a transmission 12, and the running load 5 is connected to the other end of the rotational shaft of the running motor 3.

The transmission 12 includes a speed reducer, and a forward-backward changeover mechanism for making a changeover between forward and backward movements of the base (not shown).

When the engine 1 is operated, power of the engine 1 is inputted to the rotational shaft 11a of the carrier 11 and then transmitted to the sun gear 8 and the ring gear 10 via the carrier 11 and the three planetary gears 9. The power of the engine 1 is thereby divided to be outputted to the rotational shaft 8a of the sun gear 8 and the rotational shaft 10a of the ring gear 10, respectively. The power of the engine 1 outputted to the rotational shaft 8a of the sun gear 8 is mechanically transmitted to the cargo handling load 6 via the rotational shaft of the cargo handling motor 4, thereby making it possible to drive the cargo handling load 6. At the same time, the power of the engine 1 outputted to the rotational shaft 10a of the ring gear 10 is mechanically transmitted to the running load 5 via the transmission 12 and the rotational shaft of the running motor 3, thereby making it possible to drive the running load 5.

When the engine 1 is operated and the cargo handling motor 4 is operated by being supplied with electric power from the battery 7 via the cargo handling inverter 4A, the cargo handling load 6 can also be driven by the sum of the power of the engine 1 outputted to the rotational shaft 8a of the sun gear 8 and power of the cargo handling motor 4. Similarly, when the engine 1 is operated and the running motor 3 is operated by being supplied with electric power from the battery 7 via the running inverter 3A, the running load 5 can also be driven by the sum of the power of the engine 1 outputted to the rotational shaft 10a of the ring gear 10 and the power of the running motor 3.

When surplus power is generated in the power of the engine 1 outputted to the rotational shaft 8a of the sun gear 8 and the rotational shaft 10a of the ring gear 10, the cargo handling motor 4 and the running motor 3 are operated as the electric power generating means to generate electric power, which is then stored into the battery 7 via the cargo handling inverter 4A and the running inverter 3A, respectively.

Figure 4:
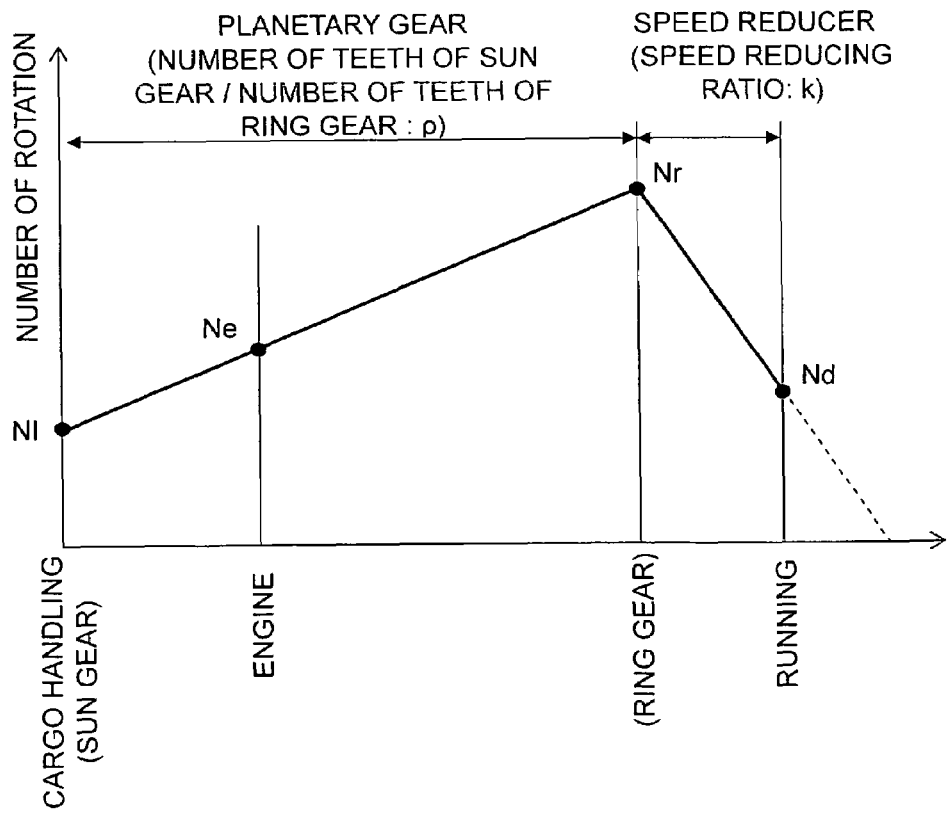
FIG. 4 is a nomograph showing relationships between a number of rotation of a running load and a number of rotation of a cargo handling load, and a number of rotation of an engine in the first embodiment.

Next, an operation of the hybrid-type forklift according to the first embodiment of the present invention will be described. As shown in, for example, FIG. 4, when a number of rotation N1 required for the cargo handling load 6 and a number of rotation Nd required for the running load 5 are determined, a number of rotation Ne of the engine 1 is calculated as follows.

First of all, when a speed reducing ratio of the speed reducer in the transmission 12 is denoted by k, a number of rotation Nr of the ring gear 10 is expressed as follows.

$Nr=Nd/k$

When a ratio of the number of teeth of the sun gear 8 to the number of teeth of the ring gear 10 is denoted by ρ, the following equation is established.

$(Ne-N1)/(Nr-Ne)=\rho$

When this equation is solved as to Ne, it is expressed as follows.

$Ne=(N1+\rho \cdot Nr)/(1+\rho)$ $=[N1+(\rho/k) \cdot Nd]/(1+\rho)$ \hfill (1)

Figure 5:
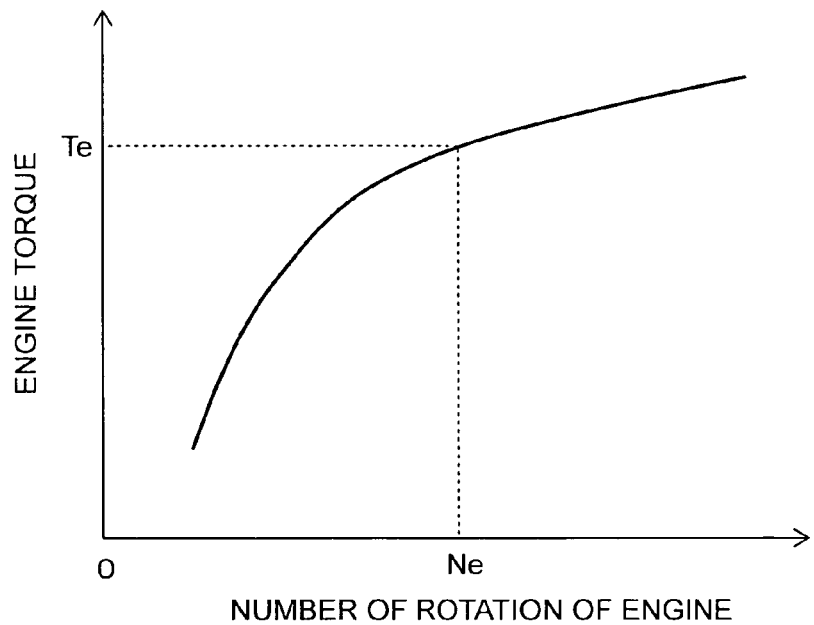
FIG. 5 is a graph showing a relationship between a number of rotation of an engine and an engine torque corresponding to a minimum fuel consumption rate.

FIG. 5 shows a minimum fuel consumption rate curve representing a relationship between a number of rotation of an engine and an engine torque corresponding to a minimum fuel consumption rate. In other words, this curve represents an operating condition allowing the engine 1 to be operated in an optimum operating state corresponding to a minimum fuel consumption rate. When the engine 1 is operated at the number of rotation of the engine Ne calculated from the above equation (1) and with an optimum torque Te corresponding to the number of rotation of the engine Ne on the minimum fuel consumption rate curve, the torque Te of the engine 1 is divided into a torque Tel and a torque Ted shown below, which are distributed to the rotational shaft of the cargo handling load 6 and the rotational shaft of the running load 5, respectively.

$Tel=Te/(1+\rho)$ $Ted=\rho Te/[k \cdot (1+\rho)]$

The sum of the torque Tel and a torque Tml of the cargo handling motor 4 is balanced with the torque Tl required for driving the cargo handling load 6. The sum of the torque Ted and a torque Tmd of the running motor 3 is balanced with the torque Td required for driving the running load 5. That is, the following equations are established.

$$Tl=Tml+Tel=Tml+Te/(1+\rho) \quad (2)$$

$$Td=Tmd+Ted=Tmd+\rho Te/[k \cdot (1+\rho)] \quad (3)$$

When Tml+Tmd<0, the cargo handling motor 4 and the running motor 3 operate as the electric power generating means and charge the battery 7. On the other hand, when Tml+Tmd≧0, the cargo handling motor 4 and the running motor 3 generate the torque Tml and the torque Tmd for supplementing the torque Tel and the torque Ted, respectively.

Figure 6:
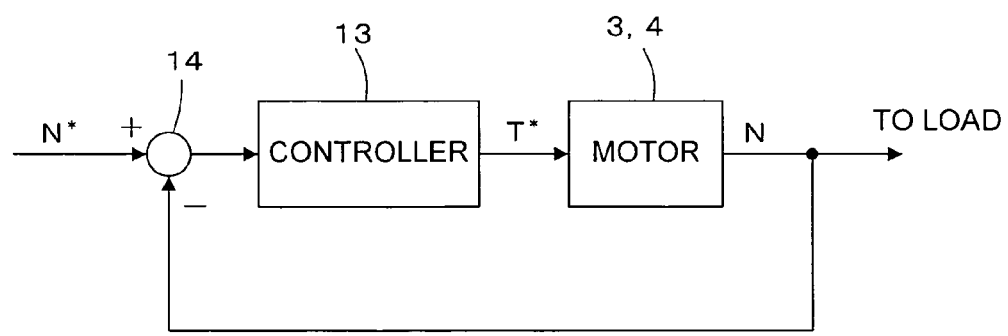
FIG. 6 is a block diagram showing a motor control system in the first embodiment.

As shown in FIG. 6, the forklift has a controller 13, which performs drive control of each of the motors 3 and 4. A subtracter 14 calculates a difference between a desired number of rotation N* required in each of the loads 5 and 6 and an actual number of rotation N of each of the motors 3 and 4. The controller 13 performs control by supplying each of the motors 3 and 4 with a torque command T* that makes the difference zero. In other words, the controller 13 controls the torque Tml of the cargo handling motor 4 and the torque Tmd of the running motor 3 such that the above equations (2) and (3) are satisfied.

As described above, since the engine 1 can be operated in an optimum operating state corresponding to a minimum fuel consumption, a hybrid-type forklift with high energy efficiency can be realized.

Since the running load 5 and the cargo handling load 6 can be directly driven by the power of the engine 1, a large power can be taken out. The running load 5 can be driven by the sum of the power of the engine 1 and the power of the running motor 3, and the cargo handling load 6 can be driven by the sum of the power of the engine 1 and the power of the cargo handling motor 4. Thus, a larger power for both running and the cargo handling operation can also be taken out, and the output of the engine 1 as a single component can also be reduced. Accordingly, a smaller engine can be used in comparison with the conventional engine-type forklift having the single engine for driving both the running load and the cargo handling load.

In addition, the running motor 3 and the cargo handling motor 4 can be operated as the electric power generating means by the surplus power of the engine 1 so as to store electric power into the battery 7, and the running motor 3 and the cargo handling motor 4 can be driven by the stored electric power. Since the two motors 3 and 4 share the electric power stored in the battery 7, they can supplement each other with electric power. Accordingly, a hybrid-type forklift with high energy efficiency can be obtained.

In performing either running or the cargo handling operation, a corresponding one of the motors 3 and 4 connected to the power dividing mechanism 2 is controlled, thereby making it possible to arbitrarily control the number of rotation of a desired one of the loads 5 and 6. The running load 5 and the cargo handling load 6 can thereby be controlled independently of each other. As a result, an improvement in operability is achieved.

Since the hydraulic pump as the cargo handling load 6 can be stopped even while running, the occurrence of a wasteful loss in hydraulic pressure can be prevented.

Since the running motor 3 is connected via the rotational shaft thereof between the power dividing mechanism 2 and the running load 5, running energy can be regenerated by generating electric power by means of the running motor 3 while running in a decelerating manner. It also becomes possible to perform accelerator-off braking, namely, automatic deceleration resulting from the release of an accelerator pedal for running, or to stop on a slope.

The engine 1 can be started by supplying the running motor 3 and the cargo handling motor 4 with electric power from the battery 7 to drive them when the engine 1 is started. Therefore, there is no need to provide a dedicated starter for starting the engine 1.

Second Embodiment

Figure 7:
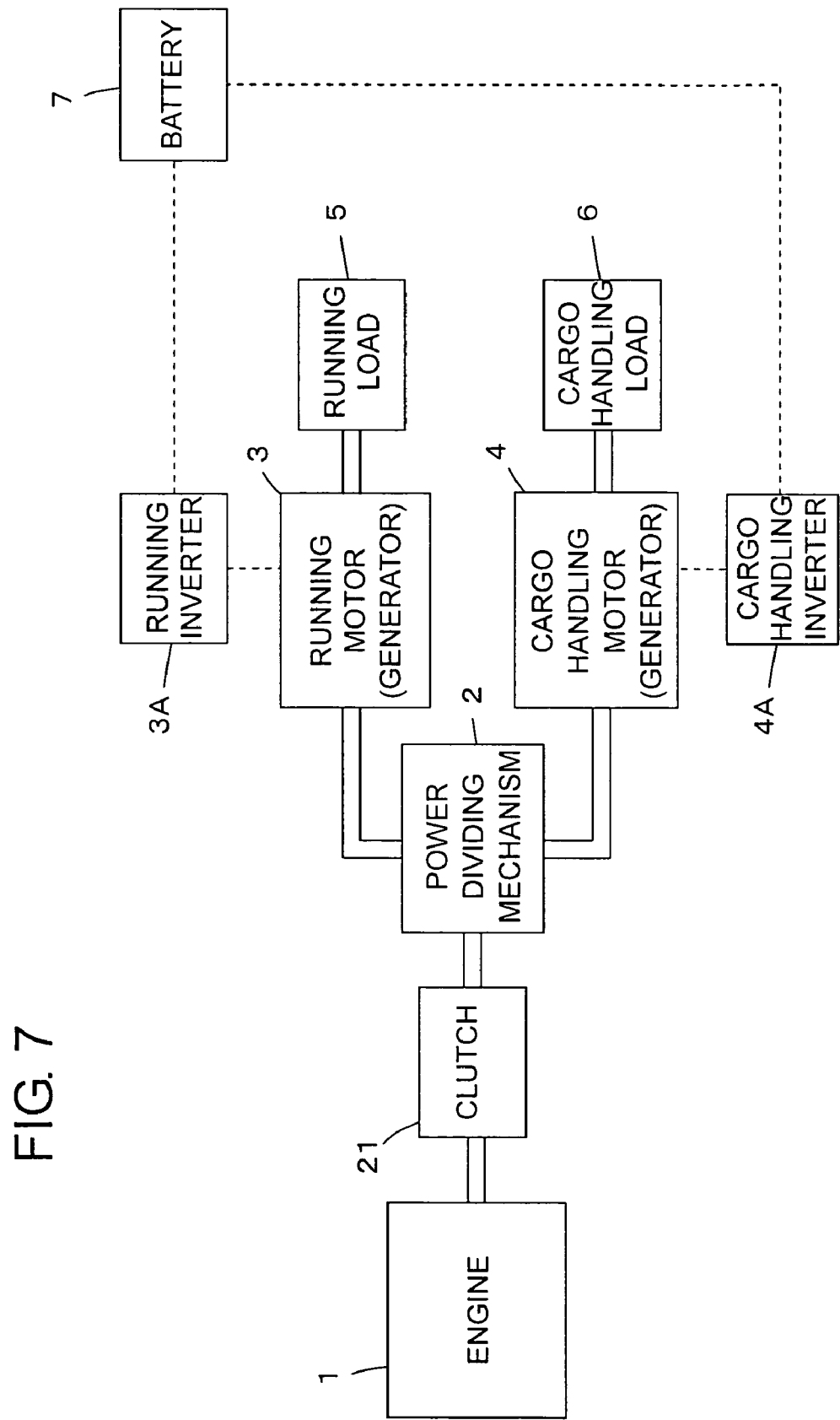
FIG. 7 is a block diagram showing a hybrid-type forklift according to a second embodiment of the present invention.
Figure 8:
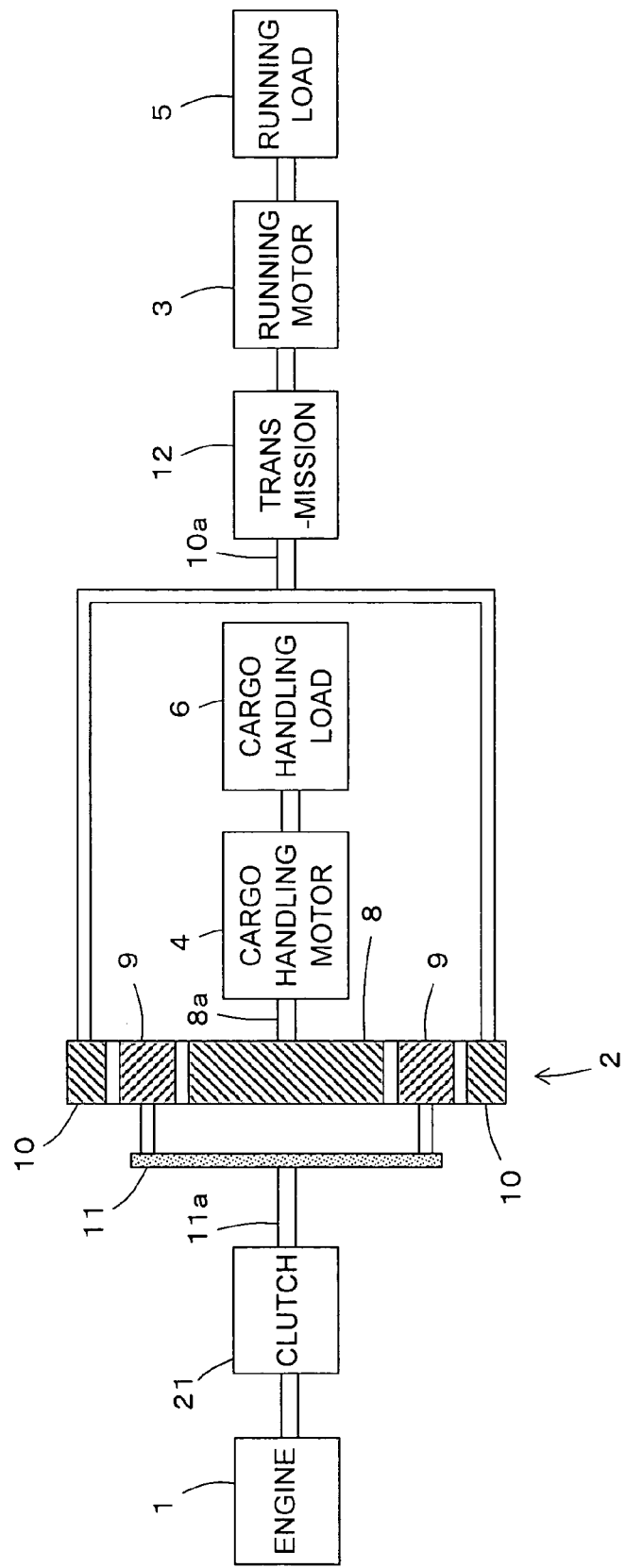
FIG. 8 is a sectional view showing a structure in the vicinity of a power dividing mechanism in the second embodiment.

FIG. 7 shows a configuration of a hybrid-type forklift according to the second embodiment of the present invention. This forklift is obtained by providing a clutch 21 between the engine 1 and the power dividing mechanism 2 in the hybrid-type forklift according to the first embodiment of the present invention. That is, as shown in FIG. 8, the engine 1 is connected to the rotational shaft 11a of the carrier 11 of the power dividing mechanism 2 via the clutch 21. The engine 1 can be connected to or disconnected from the power dividing mechanism 2 by means of the clutch 21.

Power transmission is made possible by connecting the engine 1 and the power dividing mechanism 2 to each other via the clutch 21, thereby making it possible to drive each of the loads 5 and 6 either by the power of the engine 1 alone or by the sum of the power of a corresponding one of the motors 3 and 4 and the power of the engine 1, to charge the battery 7 by the surplus power of the engine 1, as is the case in the first embodiment of the present invention. Thus, the same effect as in the first embodiment of the present invention can be substantially achieved.

Moreover, in the second embodiment of the present invention, the engine 1 and the power dividing mechanism 2 are disconnected from each other by means of the clutch 21 to shut off power transmission when a sufficient electric power is stored in the battery 7. The engine 1 is thereby stopped, and the respective motors 3 and 4 are operated by being supplied with electric power from the battery 7. As a result, the running load 5 and the cargo handling load 6 can be driven by the running motor 3 and the cargo handling motor 4, respectively. An EV mode for performing the running and the cargo handling operation by using only the motors 3 and 4 with the engine 1 being stopped is made possible as described above, so the generation of exhaust gas can be prevented. Accordingly, the hybrid-type forklift can be effectively used especially in an indoor space or the like.

An electromagnetic clutch can be used as the clutch 21. In this case, the engine 1 can be started by supplying the running motor 3 and the cargo handling motor 4 with electric power from the battery 7 to operate them while the engine 1 and the power dividing mechanism 2 are connected to each other via the clutch 21 when the engine 1 is started. Accordingly, as in the case of the first embodiment of the present invention, there is no need to provide a dedicated starter for starting the engine 1.

If a one-way clutch, which connects the engine 1 and the power dividing mechanism 2 to each other such that power is transmitted from the engine 1 to the power dividing mechanism 2 but no power is transmitted from the power dividing mechanism 2 to the engine 1, is used as the clutch 21, the same effect can be substantially achieved without performing control of the clutch 21.

Figure 9:
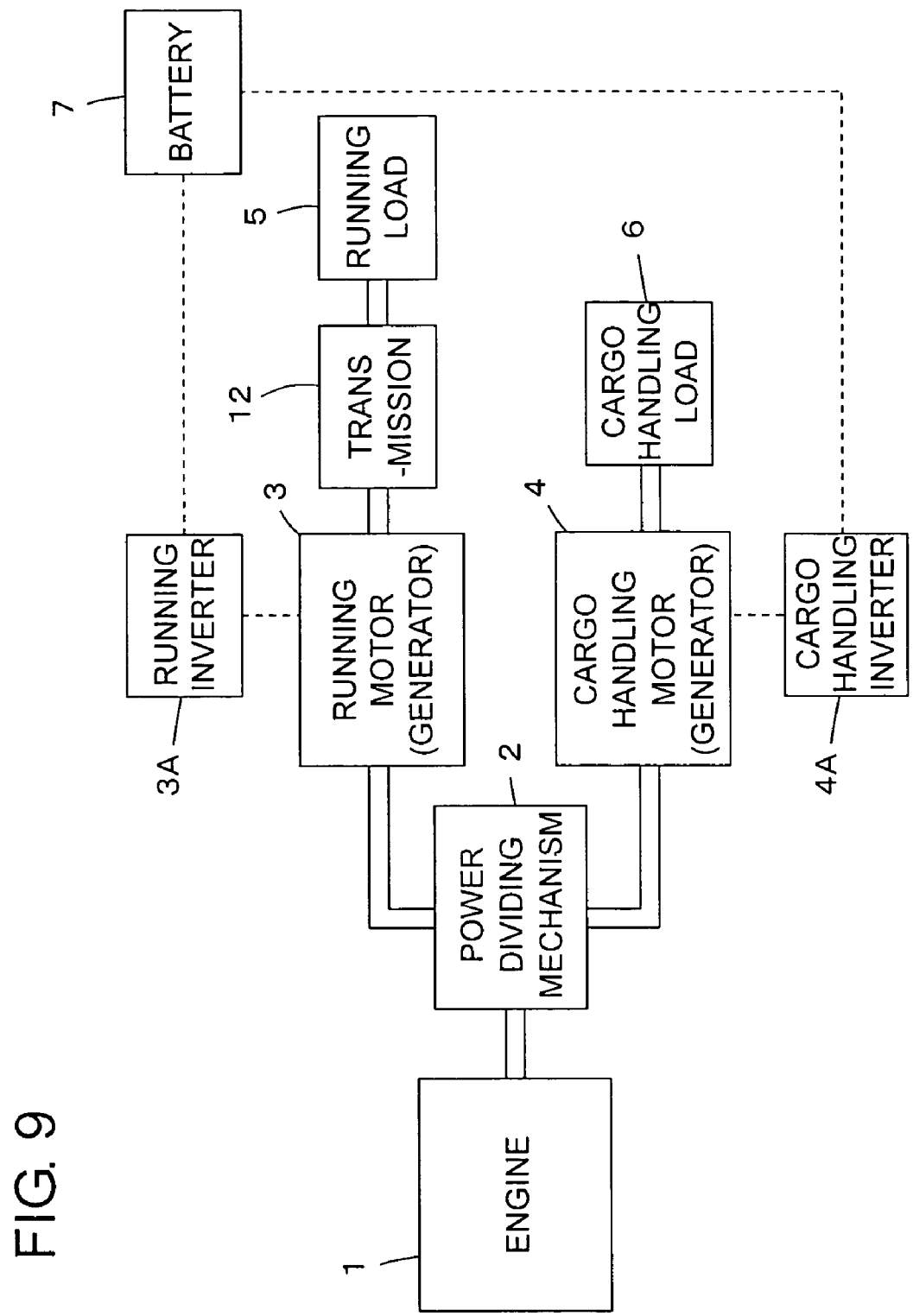
FIG. 9 is a block diagram showing a hybrid-type forklift according to a modified example of the first embodiment.
Figure 10:
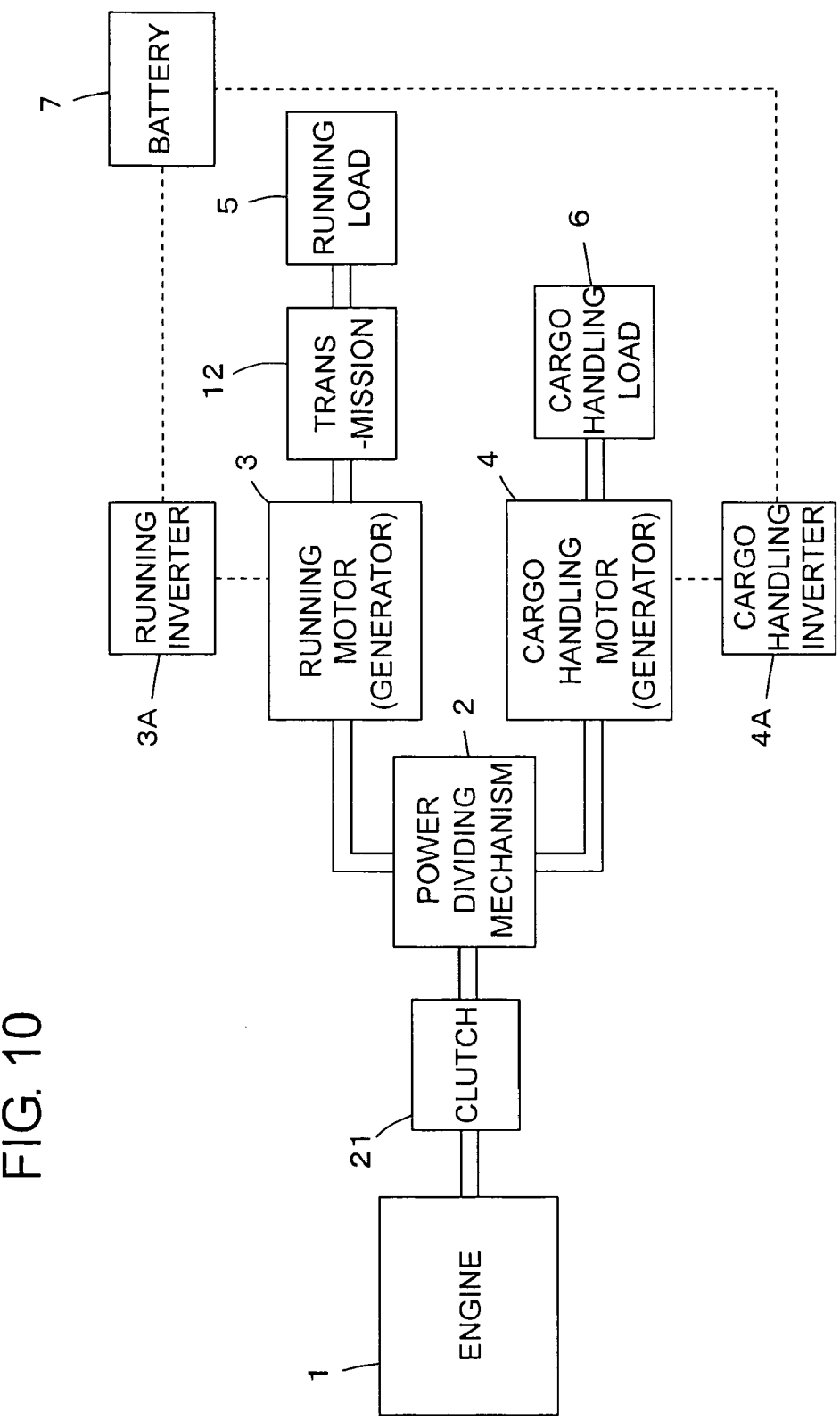
FIG. 10 is a block diagram showing a hybrid-type forklift according to a modified example of the second embodiment.

In the first embodiment and the second embodiment of the present invention, the transmission 12 is provided between the rotational shaft 10a of the ring gear 10 and the running motor 3. Instead, however, the transmission 12 can also be provided between the running motor 3 and the running load 5 as shown in FIGS. 9 and 10.

Figure 11:
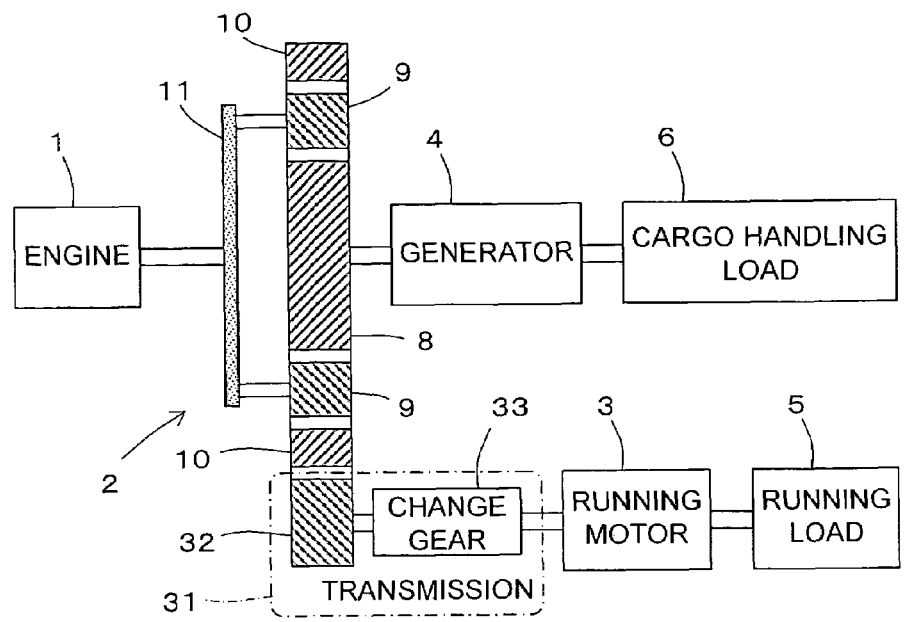
FIG. 11 is a sectional view showing a structure in the vicinity of a power dividing mechanism in another modified example of the first embodiment.
Figure 12:
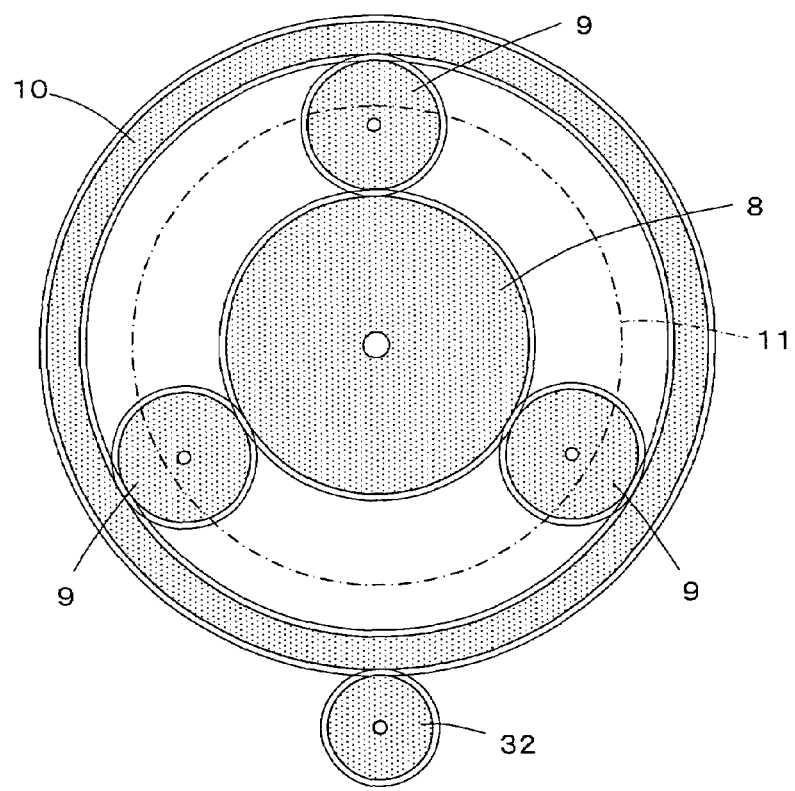
FIG. 12 is a front view showing a structure of the power dividing mechanism in another modified example of the first embodiment.

In the first embodiment, instead of connecting the transmission 12 to the rotational shaft 10a of the ring gear 10 as shown in FIG. 2, it is also possible to use a transmission 31 directly coupled to outer teeth of the ring gear 10, which are used as a second output end of the power dividing mechanism 2, as shown in FIGS. 11 and 12. The transmission 31 has a rotation takeout gear 32 constructed of an external gear for meshing with the outer teeth of the ring gear 10, and a change gear 33 connected to the rotational shaft of the rotation takeout gear 32. The running load 5 is connected to the change gear 33 via the running motor 3. The use of the transmission 31 as described above also makes it possible to drive the running load 5 by mechanically transmitting the power of the engine 1, which has been transmitted to the ring gear 10, to the running load 5 via the transmission 31 and the running motor 3. As a result, the same effect as in the first embodiment of the present invention is substantially achieved.

Figure 13:
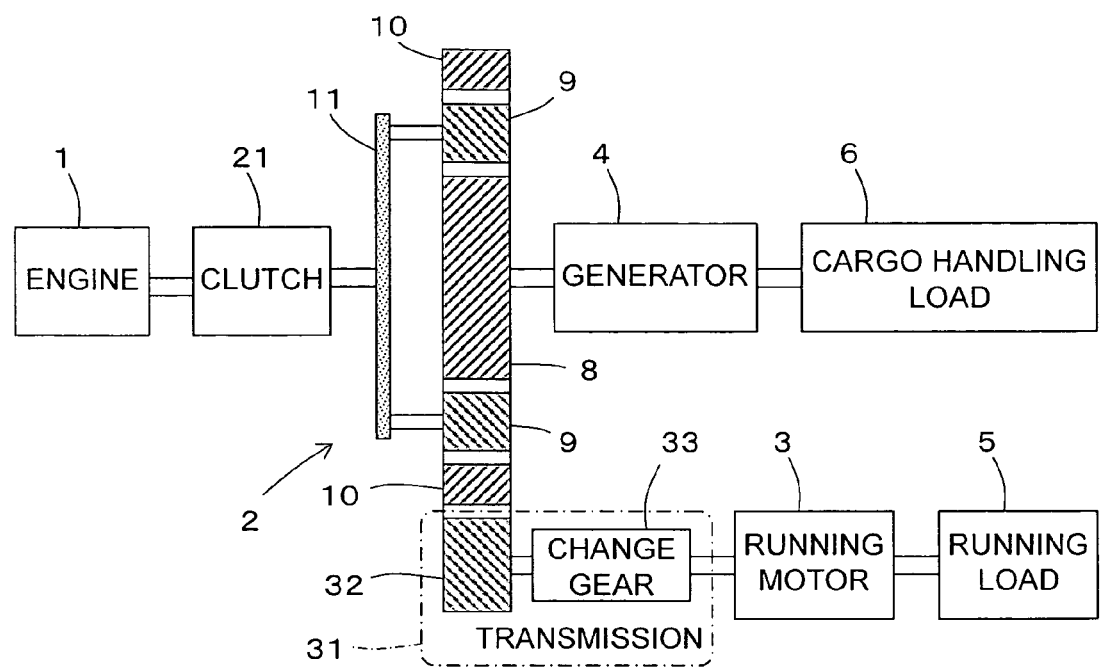
FIG. 13 is a sectional view showing a structure in the vicinity of a power dividing mechanism in another modified example of the second embodiment.

Similarly, in the second embodiment of the present invention as well, the transmission 31 directly coupled to the outer teeth of the ring gear 10 can be used as shown in FIG. 13.

Figure 14:
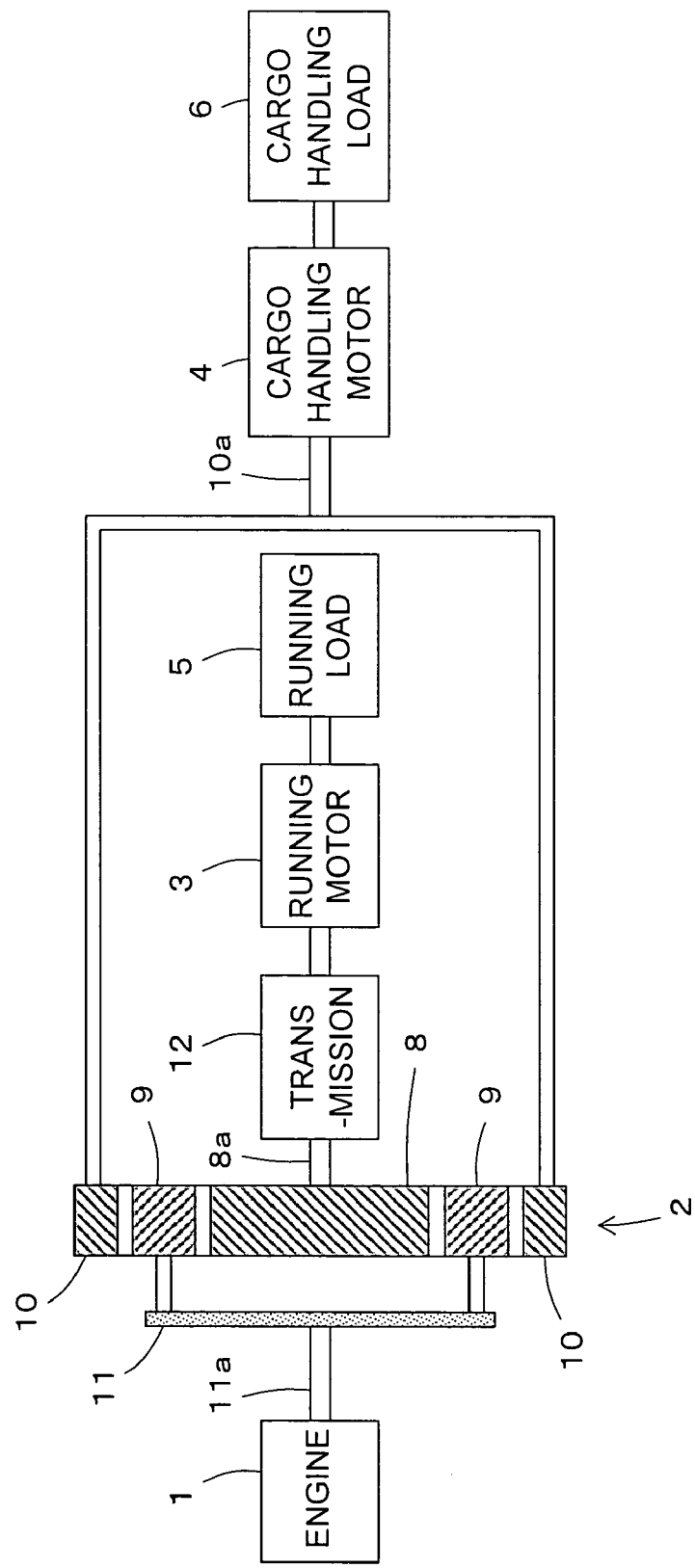
FIG. 14 is a sectional view showing a structure in the vicinity of a power dividing mechanism in still another modified example of the first embodiment.
Figure 15:
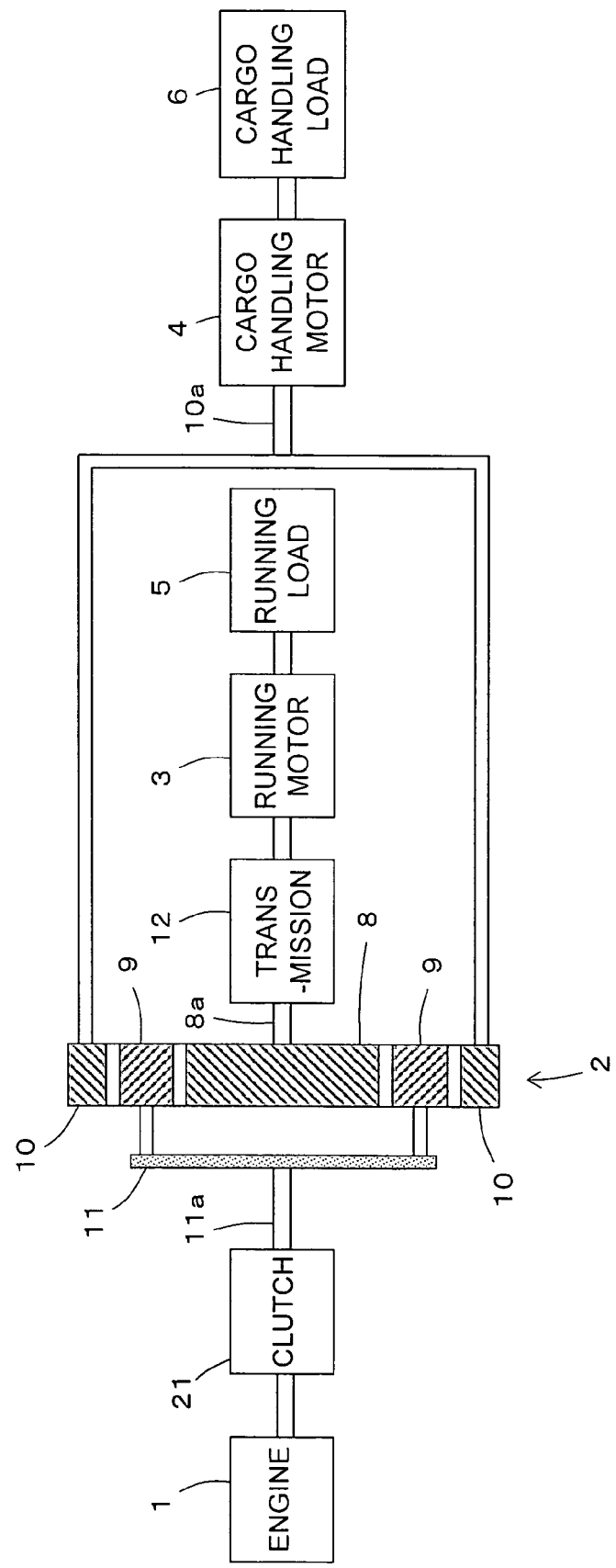
FIG. 15 is a sectional view showing a structure in the vicinity of a power dividing mechanism in still another modified example of the second embodiment.

In the first embodiment and the second embodiment, the cargo handling load 6 and the running load 5 are connected to the sun gear 8 and the ring gear 10, respectively. On the contrary, however, as shown in FIGS. 14 and 15, the cargo handling load 6 and the running load 5 may be connected to the ring gear 10 and the sun gear 8, respectively.

In the first embodiment and the second embodiment, the hydraulic pump as the cargo handling load 6 is connected to the cargo handling motor 4. If a variable displacement pump is used as the hydraulic pump, a number of rotation can be changed within a certain range with respect to a torque applied to the rotational shaft of the cargo handling load 6. Accordingly, the engine 1 can be operated in an operating state with higher efficiency, and a hybrid-type forklift with higher energy efficiency is obtained.

In the first embodiment and the second embodiment of the present invention, the engine 1 is operated in an optimum operating state corresponding to a minimum fuel consumption rate, but the present invention is not limited thereto. The engine 1 can also be operated in an optimum operating state corresponding to a minimum amount of NOx contained in exhaust gas of the engine 1 or a lowest noise level of the engine 1.

In the first embodiment and the second embodiment, a planetary gear device having, two or less, or four or more planetary gears can also be used as the power dividing mechanism 2, instead of the planetary gear device having the three planetary gears 9.

Figure 16:
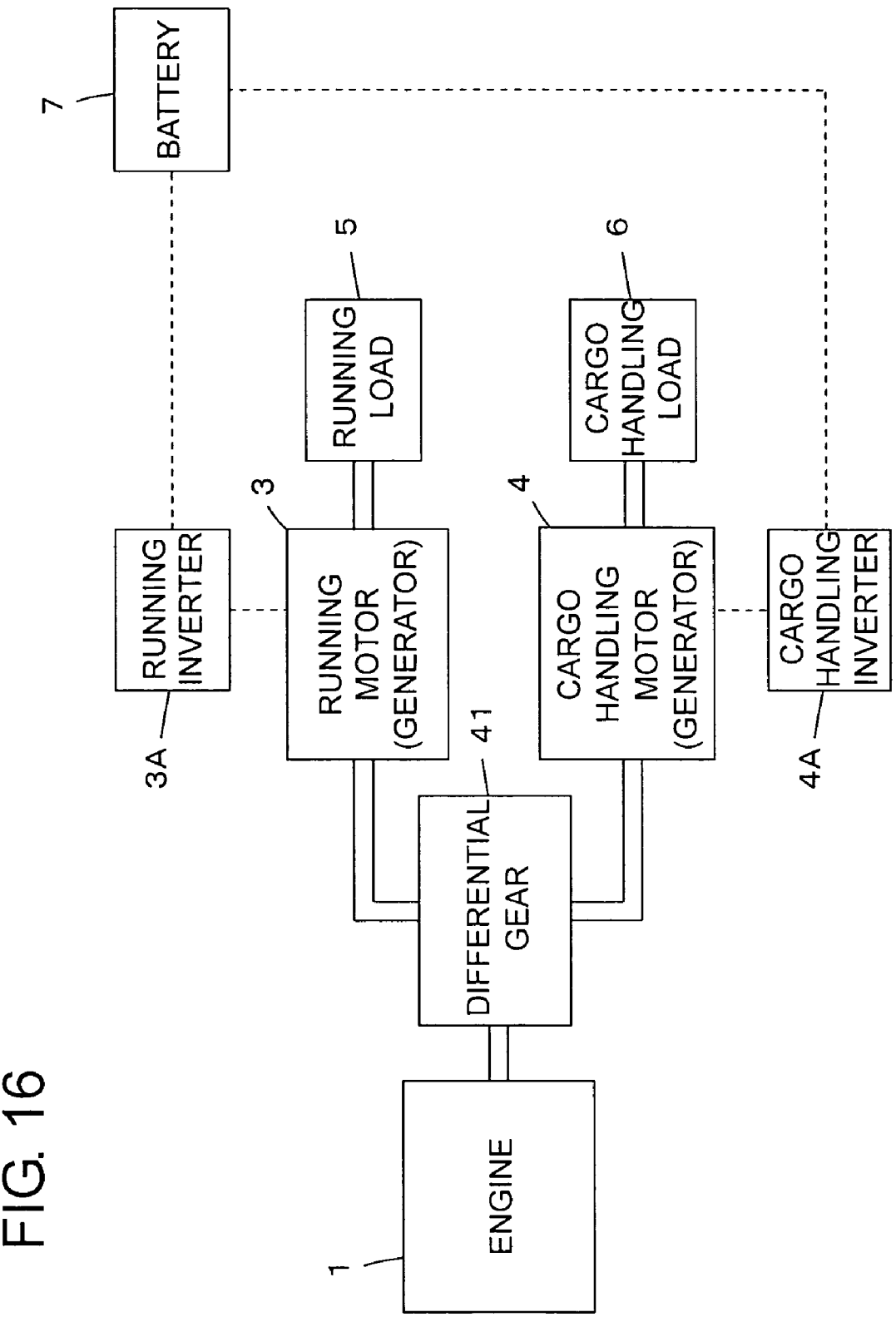
FIG. 16 is a block diagram showing a hybrid-type forklift according to yet another modified example of the first embodiment.
Figure 17:
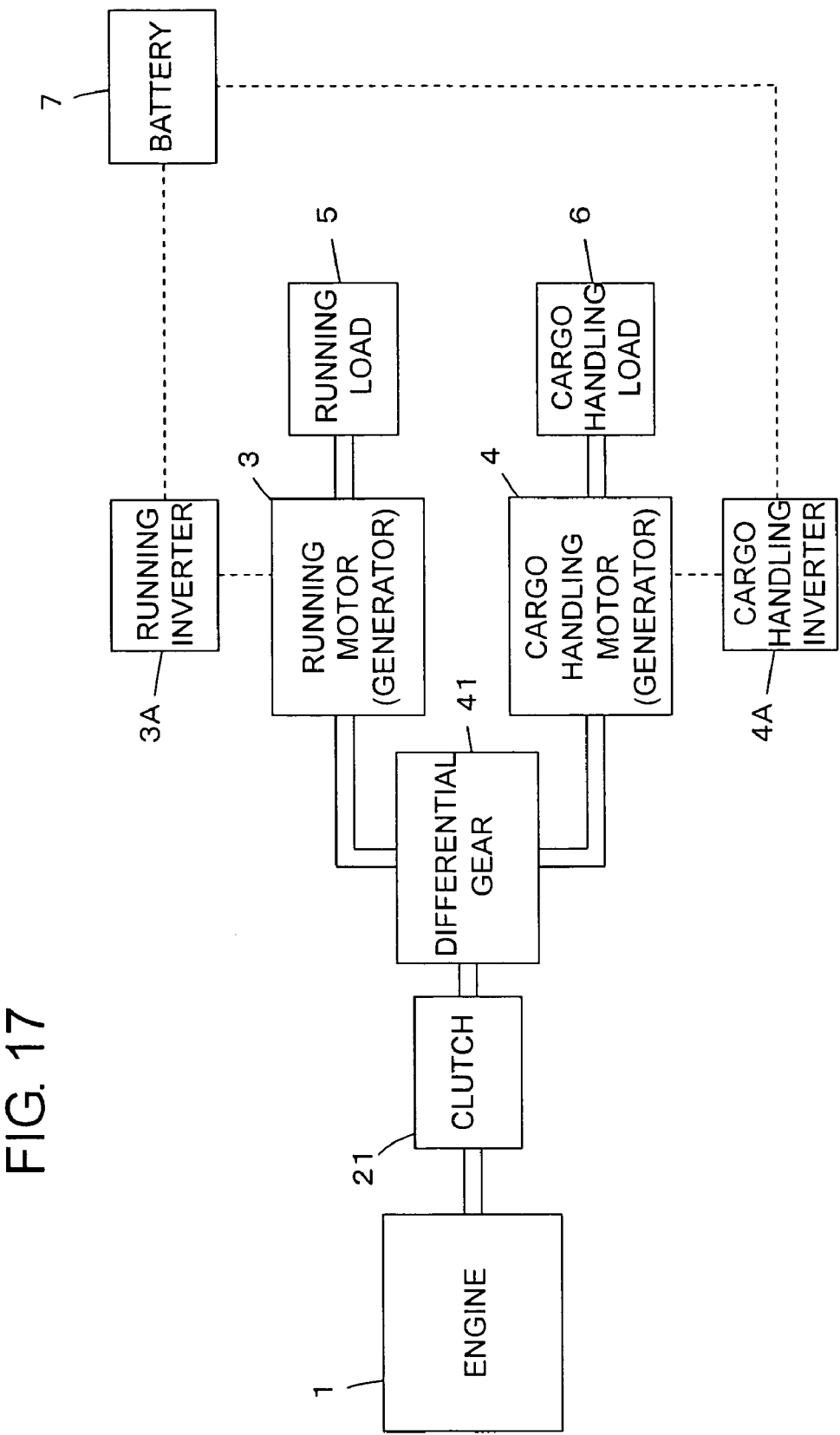
FIG. 17 is a block diagram showing a hybrid-type forklift according to yet another modified example of the second embodiment.

In place of the planetary gear device, a differential gear device 41 or the like can be used as the power dividing mechanism 2, as shown in FIGS. 16 and 17.

In the first embodiment and the second embodiment, two loads, namely, the running load 5 and the cargo handling load 6 are provided. However, three or more loads may be provided. In this case as well, motors corresponding to the respective loads are provided, and power of an engine is divided corresponding to the number of the loads through a power dividing mechanism to be outputted and transmitted to the loads via the motors. In this manner as well, the same effects as in the first embodiment and the second embodiment are achieved.

What is claimed is:

1. A hybrid-type forklift comprising:
an engine;
a power dividing mechanism connected to the engine, for dividing and outputting power of the engine to a plurality of output ends;
a plurality of motors connected to the plurality of output ends of the power dividing mechanism, respectively, each of the motors also serving as an electric power generating means; and
a battery connected to the plurality of motors, for storing electric power generated by the plurality of motors and for supplying each of the motors with electric power according to need to operate the motor,
one end of each of the rotational shafts of the plurality of motors being connected to rotational shafts used as the plurality of output ends of the power dividing mechanism respectively,
the other end of each of the rotational shafts of the plurality of motors being connected to a plurality of loads respectively,
each of the plurality of loads being driven by at least one of power from the engine and power from a corresponding one of the motors, and
when surplus power is generated in the power of the engine output to the plurality of output ends of the power dividing mechanism, each of the motors is operated by the surplus power as electric power generating means to generate electric power,
the power dividing mechanism has a planetary gear device,
the planetary gear device comprises:
a sun gear having a first output end;
a plurality of planetary gears each meshing with the sun gear and coupled to one another by a carrier having an input end; and
a ring gear meshing with the plurality of planetary gears and having a second output end,
the plurality of motors including a first motor and a second motor, the rotational shafts of which are connected to the first output end and the second output end, respectively,
the power of the engine being transmitted to the input end.

2. A hybrid-type forklift according to claim 1, wherein the plurality of loads include a running load for running and a cargo handling load for performing a cargo handling operation,
one of the first motor and the second motor bring a running motor corresponding to the running load,
the other of the first motor and the second motor being a cargo handling motor corresponding to the cargo handling load.

3. A hybrid-type forklift according to claim 2, wherein the sun gear of the planetary gear device has a rotational shaft used as the first output end while the ring gear of the planetary gear device has a rotational shaft used as the second output end.

4. A hybrid-type forklift according to claim 3, further comprising a transmission provided between the running motor and the rotational shaft of the output end of the planetary gear device to which the running motor is connected.

5. A hybrid-type forklift according to claim 3, further comprising a transmission provided between the running motor and the running load.

6. A hybrid-type forklift according to claim 2, further comprising a transmission one end of which is connected to the running motor,
the ring gear of the planetary gear device having outer teeth used as the second output end to which the other end of the transmission is directly coupled,
the cargo handling motor being connected to the first output end of the planetary gear device.

7. A hybrid-type forklift according to claim 2, wherein the cargo handling load is a variable displacement hydraulic pump for supplying hydraulic oil to a hydraulic power unit for a cargo handling operation.

* * * * *